United States Patent
Bae (10) Patent No.: US 10,148,127 B2
(45) Date of Patent: Dec. 4, 2018

(54) WIRELESS POWER TRANSMITTING APPARATUS AND METHOD THEREOF

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 500 days.

(21) Appl. No.: 14/763,934

(22) PCT Filed: Jan. 23, 2014

(86) PCT No.: PCT/KR2014/000656
§ 371 (c)(1),
(2) Date: Jul. 28, 2015

(87) PCT Pub. No.: WO2014/119871
PCT Pub. Date: Aug. 7, 2014

(65) Prior Publication Data
US 2015/0372497 A1 Dec. 24, 2015

(30) Foreign Application Priority Data
Jan. 29, 2013 (KR) .................. 10-2013-0010025

(51) Int. Cl.
*H02J 50/12* (2016.01)
*H02J 50/70* (2016.01)
*H02J 17/00* (2006.01)

(52) U.S. Cl.
CPC .............. *H02J 50/12* (2016.02); *H02J 17/00* (2013.01); *H02J 50/70* (2016.02)

(58) Field of Classification Search
None
See application file for complete search history.

(56) References Cited

U.S. PATENT DOCUMENTS

| | | | |
|---|---|---|---|
| 3,761,668 A * | 9/1973 | Harnden, Jr. | F24C 15/10 219/622 |
| 2008/0055945 A1 | 3/2008 | Chan et al. | |
| 2008/0224812 A1* | 9/2008 | Chandrasekaran | H01F 27/38 336/212 |
| 2009/0003022 A1 | 1/2009 | Nunoya et al. | |
| 2010/0104031 A1 | 4/2010 | Lacour | |
| 2011/0103114 A1* | 5/2011 | Huang | H01L 31/02021 363/131 |

(Continued)

FOREIGN PATENT DOCUMENTS

| CN | 101257247 A | 9/2008 |
|---|---|---|
| CN | 102832924 A | 12/2012 |
| KR | 10-2012-0088266 A | 8/2012 |

*Primary Examiner* — Jared Fureman
*Assistant Examiner* — James Evans
(74) *Attorney, Agent, or Firm* — Birch, Stewart, Kolasch & Birch, LLP (57) ABSTRACT

Disclosed is a wireless power transmitting apparatus to wirelessly transmit power to a wireless power receiving apparatus through a transmission resonance coil by using resonance. An AC power generating unit generates quasi square-wave AC power having quasi square-wave voltage. A transmission induction coil transmits the quasi square-wave AC power to the transmission resonance coil through electromagnetic induction.

16 Claims, 8 Drawing Sheets

(56) References Cited

U.S. PATENT DOCUMENTS

| | | | |
|---|---|---|---|
| 2011/0227421 A1* | 9/2011 | Sakoda | B60L 11/182 |
| | | | 307/104 |
| 2011/0248571 A1 | 10/2011 | Kim et al. | |
| 2012/0056580 A1 | 3/2012 | Kai et al. | |
| 2012/0300524 A1* | 11/2012 | Fornage | H02M 5/297 |
| | | | 363/132 |
| 2013/0020862 A1 | 1/2013 | Miller | |
| 2013/0051083 A1* | 2/2013 | Zhao | H02J 50/12 |
| | | | 363/17 |

* cited by examiner

WIRELESS POWER TRANSMITTING APPARATUS AND METHOD THEREOF

TECHNICAL FIELD

The embodiment relates to a wireless power transmitting apparatus and a method thereof.

BACKGROUND ART

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been attempted. The electromagnetic induction refers to a phenomenon in which a voltage is induced so that a current flows when a magnetic field is varied around a conductor. Although the commercialization of the electromagnetic induction technology has been rapidly progressed around small-size devices, the power transmission distance thereof is short.

Until now, the long-distance transmission using the electromagnetic induction, the resonance and the short-wavelength radio frequency has been used as the wireless energy transfer scheme.

Recently, an energy transfer scheme has been extensively used based on the magnetic resonance among wireless power transmission schemes.

Since a wireless power transmission system based on the electromagnetic induction scheme and the resonance scheme wirelessly transmits electrical signals generated from transmitter and receiver sides through a coil, a user can easily charge an electronic device such as a portable device with electricity.

The wireless power transmitting apparatus produces AC power having a resonance frequency and transmits the AC power to the wireless power receiving apparatus. In this case, power transmission efficiency is determined due to various causes. Meanwhile, the demand for the improvement of the wireless power transmission efficiency is increased.

DISCLOSURE OF INVENTION

Technical Problem

The embodiment provides a wireless power transmitting apparatus, capable of improving wireless power transmission efficiency, and a method thereof.

Solution to Problem

According to the first embodiment, there is provided a wireless power transmitting apparatus to wirelessly transmit power to a wireless power receiving apparatus through a transmission resonance coil by using resonance. The wireless power transmitting apparatus includes an AC power generating unit to generate quasi square-wave AC power having quasi square-wave voltage, and a transmission induction coil to transmit the quasi square-wave AC power to the transmission resonance coil through electromagnetic induction.

An input impedance of the wireless power transmitting apparatus may have a maximum value at a fundamental frequency component.

The input impedance of the wireless power transmitting apparatus may have a minimum value at a second harmonic frequency component.

The input impedance of the wireless power transmitting apparatus may be increased as an order of a harmonic frequency component is increased from the second harmonic frequency component.

A duty ratio of the quasi square-wave AC power may have a value allowing a power ratio of the quasi square-wave AC power at the fundamental frequency component to be greater than a power ratio of square-wave AC power at a fundamental frequency component when a duty ratio of the square-wave AC power is 50%.

The duty ratio of the quasi square-wave AC power may be in a range of 23% to 48%.

The duty ratio of the quasi square-wave AC power may be in a range of 28% to 34%.

The duty ratio of the quasi square-wave AC power may be in a range of 29% to 31%.

According to the second embodiment, there is provided a method of wirelessly transmitting power to a wireless power receiving apparatus through a transmission resonance coil by using resonance by a wireless power transmitting apparatus. The method includes generating quasi square-wave AC power having quasi square-wave voltage, and transmitting the quasi square-wave AC power to the transmission resonance coil through electromagnetic induction.

An input impedance of the wireless power transmitting apparatus may have a maximum value at a fundamental frequency component, and may be increased as an order of a harmonic frequency component is increased from the second harmonic frequency component.

The method further may include generating DC power, generating a sine wave, and generating an AC power control signal based on the sine wave.

The generating of the quasi square-wave AC power having the quasi square-wave voltage may include generating the quasi square-wave AC power based on the AC power control signal.

A duty ratio of the quasi square-wave AC power may have a value allowing a power ratio of the quasi square-wave AC power at the fundamental frequency component to be greater than a power ratio of square-wave AC power at the fundamental frequency component when a duty ratio of the square-wave AC power is 50%.

According to the third embodiment, there is provided a wireless power transmitting apparatus to wirelessly transmit power to a wireless power receiving apparatus through a transmission resonance coil by using resonance. The wireless power transmitting apparatus includes an AC power control unit to generate an AC power control signal, a full-bridge structure transistor circuit part to output quasi square-wave AC power having quasi square-wave voltage based on the AC power control signal, and a transmission induction coil to transmit the quasi square-wave AC power to the transmission resonance coil through electromagnetic induction.

The full-bridge structure transistor circuit part may include a first transistor comprising a drain electrode, to which DC power is applied, and a source electrode connected to one terminal of the transmission induction coil, a second transistor comprising a drain electrode connected to the source electrode of the first transistor and a source electrode connected to a ground, a third transistor comprising a drain electrode, to which the DC power is applied, and a source electrode connected to an opposite terminal of the transmission induction coil, and a fourth transistor comprising a drain electrode connected to the source electrode of the third transistor and a source electrode connected to the ground. The source electrode of the first transistor and the source electrode of the third transistor may output quasi square-wave AC power.

A duty ratio of the quasi square-wave AC power at the fundamental frequency component may have a value allowing a power ratio of the quasi square-wave AC power at the fundamental frequency component to be greater than a power ratio of square-wave AC power at the fundamental frequency component when a duty ratio of the square-wave AC power is 50%.

The duty ratio of the quasi square-wave AC power may be in a range of 23% to 48%.

An input impedance of the wireless power transmitting apparatus may have a maximum value at a fundamental frequency component, and may be increased as an order of a harmonic frequency component is increased from the second harmonic frequency component.

Advantageous Effects of Invention

As described above, according to the embodiment, the efficiency of the wireless power transmitting apparatus can be increased.

According to the embodiment, a circuit can be prevented from being broken due to high current.

According to the embodiment, the wireless charging apparatus employing the resonance scheme uses the quasi square-wave AC power to increase the efficiency of the wireless power transmitting apparatus.

BEST MODE FOR CARRYING OUT THE INVENTION

Hereinafter, embodiments will be described in detail with reference to accompanying drawings so that those skilled in the art can easily work with the embodiments. However, the embodiments may not be limited to those described below, but have various modifications. In addition, only components related to the embodiment are shown in drawings for the clarity of explanation. Hereinafter, the similar reference numerals will be assigned to the similar elements.

In the following description, when a predetermined part "includes" a predetermined component, the predetermined part does not exclude other components, but may further include other components unless otherwise indicated.

Hereinafter, a wireless power transmission system according to the embodiment will be described with reference to FIGS. 1 to 4.

Figure 1:
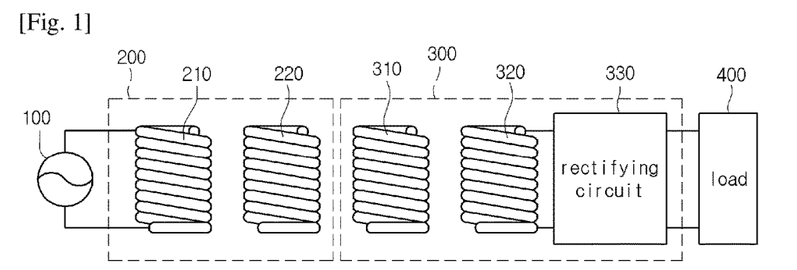
FIG. 1 is a circuit diagram to explain a wireless power transmission system according to the embodiment.

FIG. 1 is a circuit diagram to explain the wireless power transmission system according to the embodiment.

Referring to FIG. 1, the wireless power transmission system may include a power supply device 100, a wireless power transmitting apparatus 200, a wireless power receiving apparatus 300 and a load 400.

The power supply device 100 according to the embodiment may be included in the wireless power transmitting apparatus 200.

The wireless power transmitting apparatus 200 may include a transmission induction coil 210 and a transmission resonant coil 220.

The wireless power receiving apparatus 300 may include a reception resonant coil 310, a reception induction coil 320 and a rectifying circuit 330.

Both terminals of the power supply device 100 are connected to both terminals of the transmission induction coil 210.

The transmission resonant coil 220 may be spaced apart from the transmission induction coil 210 by a predetermined distance.

The reception resonant coil 310 may be spaced apart from the reception induction coil 320 by a predetermined distance.

Both terminals of the reception induction coil 320 are connected to both terminals of the rectifying circuit 330, and the load 400 is connected to both terminals of the rectifying circuit 330. According to an embodiment, the load 400 may be included in the wireless power receiving apparatus 300.

The power generated from the power supply device 100 is transmitted to the wireless power transmitting apparatus

200. The power received in the wireless power transmitting apparatus 200 is transmitted to the wireless power receiving apparatus 300 that makes resonance with the wireless power transmitting apparatus 200 due to a resonance phenomenon, that is, has the resonance frequency the same as that of the wireless power transmitting apparatus 200.

Hereinafter, the power transmission process will be described in more detail.

The power supply device 100 generates AC power having a predetermined frequency and transmits the AC power to the wireless power transmitting apparatus 200.

The transmission induction coil 210 and the transmission resonant coil 220 are inductively coupled with each other. In other words, if AC current flows through the transmission induction coil 210 due to the power received from the power supply device 100, the AC current is induced to the transmission resonant coil 220 physically spaced apart from the transmission induction coil 210 due to the electromagnetic induction.

Thereafter, the power received in the transmission resonant coil 220 is transmitted to the wireless power receiving apparatus 300, which makes a resonance circuit with the wireless power transmitting apparatus 200, by using resonance.

Power may be transmitted between two LC circuits, which are impedance-matched with each other by using resonance. The power transmitted through the resonance may be farther transmitted with higher efficiency when comparing with the power transmitted through the electromagnetic induction.

The reception resonant coil 310 receives power from the transmission resonant coil 220 through the resonance. The AC current flows through the reception resonant coil 310 due to the received power. The power received in the reception resonant coil 310 is transmitted to the reception induction coil 320, which is inductively coupled with the reception resonant coil 310, due to the electromagnetic induction. The power received in the reception induction coil 320 is rectified by the rectifying circuit 330 and transmitted to the load 400.

According to the embodiment, the transmission induction coil 210, the transmission resonant coil 220, the reception resonant coil 310, and the reception induction coil 320 may have the shape such as a circular shape, an oval shape, or a square shape, but the embodiment is not limited thereto.

The transmission resonant coil 220 of the wireless power transmitting apparatus 200 may transmit power to the reception resonant coil 310 of the wireless power receiving apparatus 300 through a magnetic field.

In detail, the transmission resonant coil 220 and the reception resonant coil 310 are coupled with each other by using resonance to operate at a resonance frequency.

As the transmission resonant coil 220 and the reception resonant coil 310 are coupled with each other by using resonance, the power transmission efficiency between the wireless power transmitting apparatus 200 and the wireless power receiving apparatus 300 can be significantly improved.

A quality factor and a coupling coefficient are important in the wireless power transmission. That is, as the quality factor and the coupling coefficient have greater values, the power transmission efficiency may be more improved.

The quality factor may refer to an index of energy that may be stored in the vicinity of the wireless power transmitting apparatus 200 or the wireless power receiving apparatus 300.

The quality factor may vary according to the operating frequency $\omega$ as well as a shape, a dimension and a material of a coil. The quality factor may be expressed as an equation, $Q=\omega*L/R$. In the above equation, L refers to the inductance of the coil and R refers to resistance corresponding to the quantity of power loss caused in the coil.

The quality factor may have a value of 0 to infinity. As the quality factor has a greater value, the power transmission efficiency between the wireless power transmitting apparatus 200 and the wireless power receiving apparatus 300 may be more improved.

The coupling coefficient represents the degree of inductive magnetic coupling between a transmission coil and a reception coil, and has a value of 0 to 1.

The coupling coefficient may vary according to the relative position and the distance between the transmission coil and the reception coil.

Figure 2:
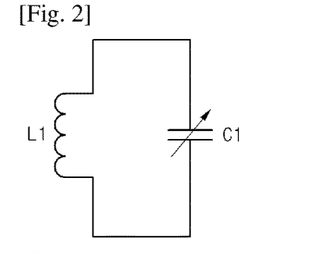
FIG. 2 is a circuit diagram showing an equivalent circuit of a transmission induction coil according to the embodiment.

FIG. 2 is a circuit diagram showing an equivalent circuit of the transmission induction coil 210 according to the embodiment.

As shown in FIG. 2, the transmission induction coil 210 may include an inductor L1 and a capacitor C1, and a circuit having an appropriate inductance and an appropriate capacitance is configured through the inductor L1 and the capacitor C1.

The transmission induction coil 210 may have an equivalent circuit in which both terminals of the inductor L1 are connected with both terminals of the capacitor C1. In other words, the transmission induction coil 210 may have an equivalent circuit in which the inductor L1 and the capacitor C1 are connected with each other in parallel.

The capacitor C1 may include a variable capacitor, and the impedance matching may be performed as the capacitance of the capacitor C1 is adjusted. The equivalent circuits of the transmission resonant coil 220, the reception resonant coil 310, and the reception induction coil 320 may have the same as the circuit shown in FIG. 2.

Figure 3:
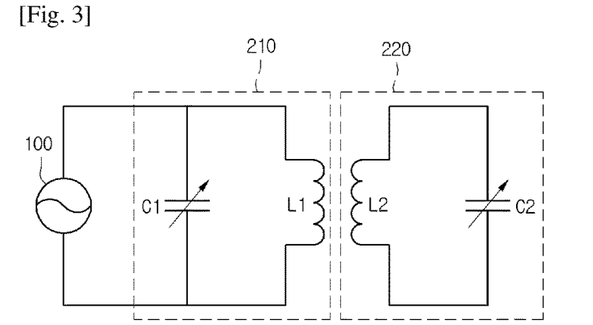
FIG. 3 is a circuit diagram showing an equivalent circuit of a power supply device and a wireless power transmitting apparatus according to the embodiment.

FIG. 3 is a circuit diagram showing an equivalent circuit of the power supply device 100 and the wireless power transmitting apparatus 200 according to the embodiment.

As shown in FIG. 3, the transmission induction coil 210 may include the inductor L1 having a predetermined inductance and the capacitor C1 having a predetermined capacitance. The transmission resonant coil 220 may include an inductor L2 having a predetermined inductance and a capacitor C2 having a predetermined capacitance.

Figure 4:
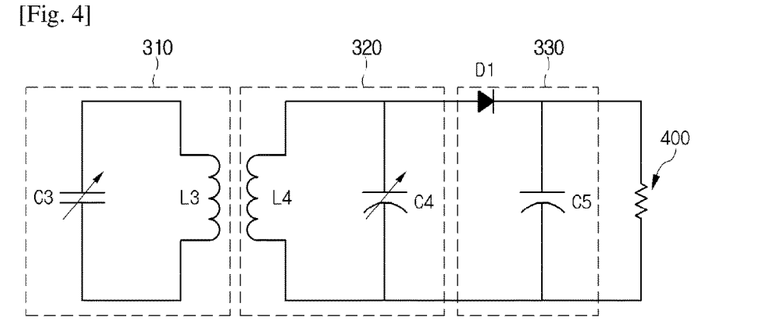
FIG. 4 is a circuit diagram showing an equivalent circuit of the wireless power receiving apparatus according to the embodiment.

FIG. 4 is a circuit diagram showing an equivalent circuit of the wireless power receiving apparatus 300 according to the embodiment.

As shown in FIG. 4, the reception resonant coil 310 may include an inductor L3 having a predetermined inductance and a capacitor C3 having a predetermined capacitance. The reception induction coil 320 may include an inductor L4 having a predetermined inductance and a capacitor C4 having a predetermined capacitance.

The rectifying circuit 330 may convert AC power transferred from the reception induction coil 320 into DC power and may transfer the DC power to the load 400.

In detail, the rectifying circuit 330 may include a rectifier and a smoothing circuit. The rectifier according to one embodiment may include a silicon rectifier and, as shown in FIG. 4, may be equivalent to a diode D1.

The rectifier may convert AC power transferred from the reception induction coil 320 into DC power.

The smoothing circuit may remove AC components included in the DC power converted by the rectifier to output a smoothed DC power waveform. According to an embodiment, as shown in FIG. 4, the smoothing circuit may include a rectifying capacitor C5, but the embodiment is not limited thereto.

The load 400 may include a predetermined rechargeable battery or a device requiring the DC power. For example, the load 400 may refer to a battery.

The wireless power receiving apparatus 300 may be installed in an electronic device, such as a cellular phone, a laptop computer or a mouse, requiring the power. Accordingly, the reception resonant coil 310 and the reception induction coil 320 may have the shape suitable for that of an electronic device.

The wireless power transmitting apparatus 200 may exchange information with the wireless power receiving apparatus 300 through in-band or out-of-band communication.

The in-band communication may refer to the communication for exchanging information between the wireless power transmitting apparatus 200 and the wireless power receiving apparatus 300 by using a signal having a frequency used in the wireless power transmission. The wireless power receiving apparatus 300 may further include a switch. The wireless power receiver 300 may receive the power transmitted from the wireless power transmitting apparatus 200 through a switching operation of the switch or may not receive the power transmitted from the wireless power transmitting apparatus 200. Thus, the wireless power transmitting apparatus 200 detects the quantity of power consumed in the wireless power transmitting apparatus 200, so that the wireless power transmitting apparatus 200 may recognize an on or off signal of the switch included therein.

In detail, the wireless power receiving apparatus 300 may change the quantity of power dissipated in a resistor by using the resistor and a switch, so that the power consumed in the wireless power transmitting apparatus 200 may be changed. The wireless power transmitting apparatus 200 may sense a change of the dissipated power to obtain information about a state of the wireless power receiving apparatus 300. The switch and the resistor may be connected in series to each other. The information about a state of the wireless power receiving apparatus 300 may include information about a current charged quantity and/or the change of charged quantity of the wireless power receiving apparatus 300.

In more detail, when the switch is opened, the power dissipated in the resistor is 0 (zero) and the power dissipated in the wireless power transmitting apparatus 200 is also reduced.

If the switch is shorted, the power dissipated in the resistor is more than 0 and the power consumed in the wireless power transmitting apparatus 200 is increased. While the wireless power receiving apparatus repeats the above operation, the wireless power transmitting apparatus 200 may detect the power consumed in the wireless power transmitting apparatus 200 and may perform digital communication with the wireless power receiving apparatus 300.

The wireless power transmitting apparatus 200 receives the information about the state of the wireless power receiving apparatus 300 according to the above operation, so that the wireless power transmitting apparatus 200 may transmit the power appropriate to the reception state of the wireless power receiving apparatus 300.

To the contrary, the wireless power transmitting apparatus 200 may include a resistor and a switch to transmit the information about the state of the wireless power transmitting apparatus 200 to the wireless power receiving apparatus 300. According to one embodiment, the information about the state of the wireless power transmitting apparatus 200 may include information about the maximum quantity of power to be supplied from the wireless power transmitting apparatus 200, the number of wireless power receiving apparatus 300 receiving the power from the wireless power transmitting apparatus 200 and the quantity of available power of the wireless power transmitting apparatus 200.

Hereinafter, the out-of-band communication will be described.

The out-of-band communication refers to the communication performed through a specific frequency band other than the resonance frequency band in order to exchange information necessary for the power transmission. The wireless power transmitting apparatus 200 and the wireless power receiving apparatus 300 can be equipped with out-of-band communication modules to exchange information necessary for the power transmission. The out-of-band communication module may be installed in the power supply device. In one embodiment, the out-of-band communication module may use a short-distance communication technology, such as Bluetooth, Zigbee, WLAN or NFC, but the embodiment is not limited thereto.

Hereinafter, the power supply device 100 according to the first embodiment will be described with reference to FIGS. 5 to 10.

Figure 5:
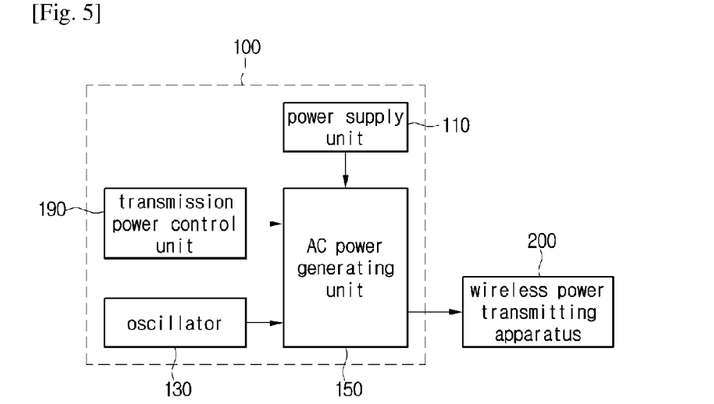
FIG. 5 is a block diagram showing a power supply device according to the first embodiment.

FIG. 5 is a block diagram showing a power supply device according to the first embodiment.

As shown in FIG. 5, the power supply device 100 according to the first embodiment may include a power supply unit 110, an oscillator 130, an AC power generating unit 150, and a transmission power control unit 190. The power supply unit 100 may be connected with the wireless power transmitting apparatus 200.

The power supply device 100 may be included in the wireless power transmitting apparatus 200, but the embodiment is not limited thereto.

The power supply unit 110 generates DC power having a DC voltage to be output to an output terminal.

The oscillator 130 generates a sine-wave AC signal.

The transmission power control unit 190 generates a control signal to control the AC power generating unit 150.

The AC power generating unit 150 generates AC power having a voltage having a square wave by amplifying the sine-wave AC signal of the oscillator 130 using the DC power of the power supply unit 110 according to the control signal of the transmission power control unit 190.

The wireless power transmitting apparatus 200 transmits the AC power of the AC power generating unit 150 to the wireless power receiving apparatus 300 by using resonance.

Figure 6:
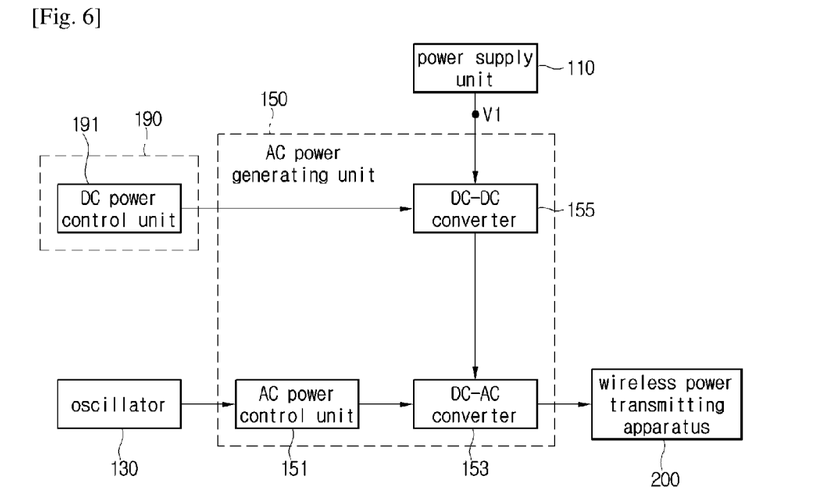
FIG. 6 is a block diagram showing an AC power generating unit and a transmission power control unit according to the first embodiment.

FIG. 6 is a block diagram showing the AC power generating unit and the transmission power control unit according to the first embodiment.

As shown in FIG. 6, the AC power generating unit 150 according to the first embodiment includes an AC power control unit 151, a DC-AC converter 153, and a DC-DC converter 155. The transmission power control unit 190 includes a DC power control unit 191.

The AC power control unit 151 generates an AC power control signal based on the sine-wave AC signal of the oscillator 130.

The DC power control unit 191 generates a DC power control signal so that the DC-DC converter 155 may output power having target DC voltage.

The DC-DC converter 155 converts the DC power (first DC power) of the power supply unit 110 into DC power (second DC power) having the target DC voltage based on the DC power control signal.

The DC-AC converter 153 converts the second DC power of the DC-DC converter 155 into AC power having the square-wave AC voltage based on the AC power control signal and outputs the converted signal to the transmission induction coil 210.

Figure 7:
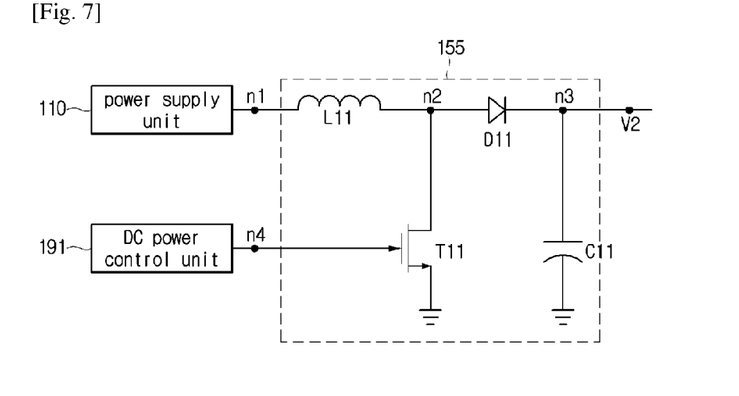
FIG. 7 is a circuit diagram showing a DC-DC converter according to the first embodiment.

FIG. 7 is a circuit diagram showing a DC-DC converter according to the first embodiment.

As shown in FIG. 7, the DC-DC converter 155 includes an inductor L11, a power switch T11, a diode D11, and a capacitor C11. The power switch T11 may be realized by using a transistor. For example, the power switch T11 may include an N-channel metal-oxide-semiconductor field-effect transistor (NMOSFET), but may include different devices performing the same operation.

One terminal of the inductor L11 is connected to an output terminal of the power supply unit 110, that is, a first node n1, and an opposite terminal of the inductor L11 is connected to a drain electrode of a power switch T112, that is, a second node n2.

A gate electrode of the power switch T11 is connected to an output terminal of a DC power control unit 191, that is, a fourth node n4, and a source electrode of the power switch T11 is connected to a ground terminal.

An anode electrode of a diode D11 is connected to a drain electrode of the power switch T11, that is, a second electrode n2, and a cathode electrode of the diode D11 is connected to a third node n3.

One terminal of a capacitor C11 is connected to the cathode electrode of the diode D11, that is, the third node n3, and an opposite terminal of the capacitor C11 is connected to the ground terminal.

Figure 8:
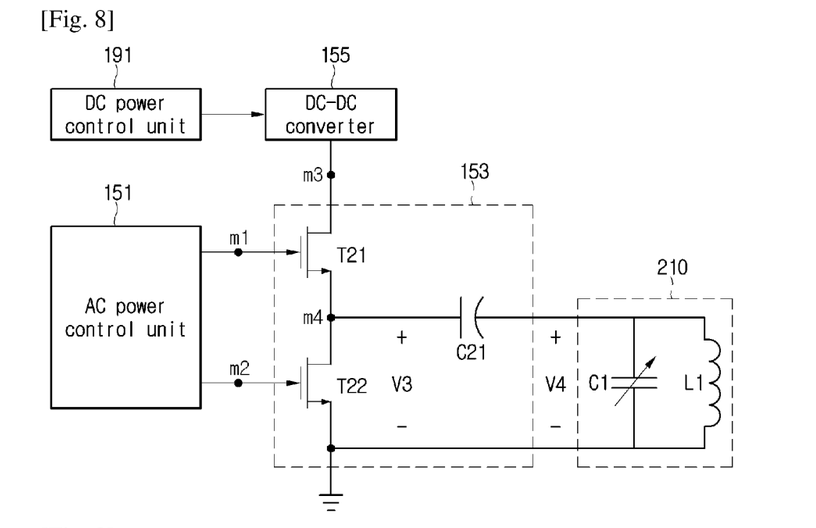
FIG. 8 is a circuit diagram showing a DC-AC converter according to the first embodiment.

FIG. 8 is a circuit diagram showing a DC-AC converter according to the first embodiment.

As shown in FIG. 8, a DC-AC converter 153 includes a transistor circuit part having a half-bridge structure. The transistor circuit part having the half-bridge structure includes an upper transistor T21, a lower transistor T22, and a DC cut-off capacitor C21, and is connected to the AC power control unit 151 and the transmission induction coil 210. The DC-AC converter 153 is connected to the DC-DC converter 155. The upper transistor T21 and the lower transistor T22 may be N-channel metal-oxide-semiconductor field-effect transistor (NMOS). In addition, the upper and lower transistors T21 and T22 may be substituted with different devices performing the same operation as that of the NMOS.

The AC power control unit 151 generates an AC power control signal based on a sine-wave AC signal of the oscillator through an upper transistor control signal output terminal, that is, the first node m1, and a lower transistor control signal output terminal, that is, the second node m2. The AC power control unit 151 generates an upper transistor control signal serving as an AC power control signal based on the sine-wave AC signal of the oscillator 130, and outputs the upper transistor control signal through the first node m1. The AC power control unit 151 generates a lower transistor control signal serving as an AC power control signal based on the sine-wave AC signal of the oscillator 130, and outputs the lower transistor control signal through the second node m2.

A drain electrode of an upper transistor T21 is connected to an output terminal of the DC-DC converter 155, that is, a third node m3, and a gate electrode of the upper transistor T21 is connected to the upper transistor control signal output terminal of the AC power control unit 151, that is, the first node m1.

A drain electrode of a lower transistor T22 is connected to a source electrode of the upper transistor T21, that is, a fourth node m4, a gate electrode of the lower transistor T22 is connected to the lower transistor control signal output terminal of the AC power control unit 151, that is, the second node m2, and a source electrode of the lower transistor T22 is connected to the ground terminal.

One terminal of the DC cut-off capacitor C21 is connected to the fourth node m4, and an opposite terminal of the DC cut-off capacitor C21 is connected to one terminal of the inductor L1. An opposite terminal of the inductor L1 is connected to the ground terminal.

Hereinafter, the wireless power transmission method according to the first embodiment will be described with reference to FIGS. 9 and 10.

Figure 9:
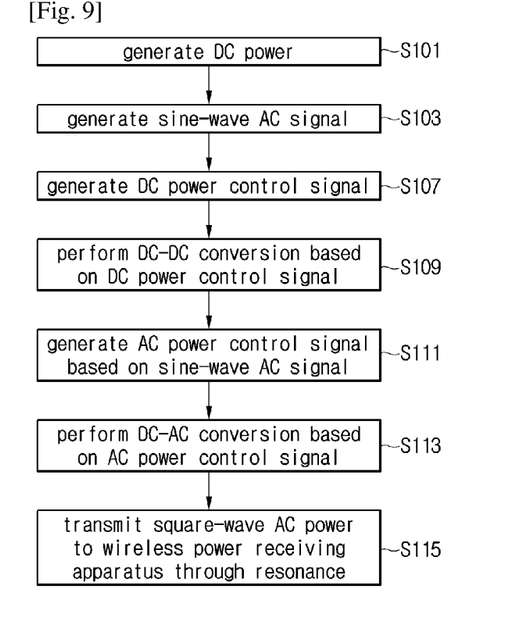
FIG. 9 is a flowchart showing a wireless power transmission method according to the first embodiment.
Figure 10:
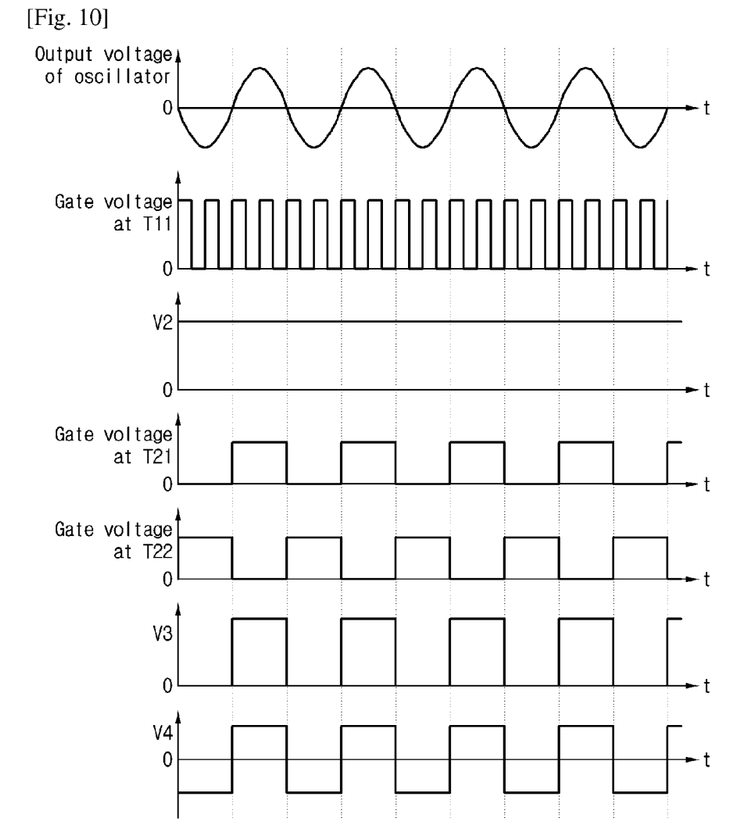
FIG. 10 illustrates waveforms at nodes in the power supply device according to the first embodiment.

FIG. 9 is a flowchart showing the wireless power transmission method according to the first embodiment, and FIG. 10 illustrates waveforms at nodes in the power supply device according to the first embodiment.

In particular, FIG. 9 illustrates the wireless power transmission method in which the embodiments of FIGS. 6 to 8 are realized.

The power supply unit 110 generates DC power having DC voltage (step S101). In particular, the power supply unit 110 may convert the AC power having the AC voltage into the DC power having the DC voltage.

The oscillator 130 generates the sine-wave AC signal (step S103).

The DC power control unit 191 generates a DC power control signal to allow the DC-DC converter 155 to output DC power having target DC voltage (step S107) and outputs the DC power control signal to the gate electrode of the transistor T11. The DC power control signal may be a pulse width modulation (PWM) signal provided at the whole duration as shown in FIG. 10.

The DC-DC converter 155 converts the output power of the power supply unit 110 into DC power having target DC voltage based on the DC power control signal (step S109). The magnitude of the output voltage of the DC-DC converter 155 may be equal to the magnitude of the output voltage of the power supply unit 110, and greater than or less than that of the output voltage of the power supply unit 110.

The AC power control unit 151 generates the AC power control signal based on the sine-wave AC signal of the oscillator 130 (step S111). The AC power control unit 151 may generate the upper transistor control signal serving as the AC power control signal based on the sine-wave AC signal of the oscillator 130 and output the upper transistor control signal through the first node m1. The AC power control unit 151 may generate the lower transistor control signal serving as the AC power control signal based on the sine-wave AC signal of the oscillator 130 and output the lower transistor control signal through the second node m2.

Hereinafter, the upper and lower transistor control signals will be described with reference to FIG. 10.

As shown in FIG. 10, the upper and lower transistor control signals have square waves.

One period of the upper transistor control signal sequentially includes a turn-on time slot of the upper transistor T21 and a turn-off time slot of the upper transistor T21. The turn-on time slot of the upper transistor T21 corresponds to a half period of the sine-wave AC signal of the oscillator 130, and the turn-off time slot of the upper transistor T21 may correspond to a remaining half period of the sine-wave AC signal.

One period of the lower transistor control signal sequentially includes a turn-on time slot of the lower transistor T22 and a turn-off time slot of the lower transistor T22. The turn-on time slot of the lower transistor T22 corresponds to a half period of the sine-wave AC signal, and the turn-off time slot of the lower transistor T22 may correspond to a remaining half period of the sine-wave AC signal.

The upper transistor control signal has a level to turn on the upper transistor T21 during the turn-on time slot of the upper transistor T21. The level to turn on the upper transistor T21 may be a high level.

The upper transistor control signal has a level to turn off the upper transistor T21 during the turn-off time slot of the upper transistor T21. The level to turn off the upper transistor T21 may be a low level.

The lower transistor control signal has a level to turn on the lower transistor T22 at the turn-on time slot of the lower transistor T22. The level to turn on the lower transistor T22 may be a high level.

The lower transistor control signal has a level to turn off the lower transistor T22 at the turn-off time slot of the lower transistor T22. The level to turn off the lower transistor T22 may be a low level.

During the turn-on time slot of the upper transistor T21, the lower transistor control signal during the turn-off time slot of the lower transistor T22 has a level to turn off the lower transistor T22.

During the turn-on time slot of the lower transistor T22, the lower transistor control signal during the turn-off time slot of the upper transistor T21 has a level to turn off the lower transistor T22.

In order to prevent the upper and lower transistors T21 and T22 from being shorted as the upper and lower transistors T21 and T22 are simultaneously turned on, the upper and lower transistor control signals may have dead time slots. During the dead time slot, the upper transistor control signal has a level to turn off the upper transistor T21, and the lower transistor control signal may have a level to turn off the lower transistor T22.

In order to output power having square-wave voltage with a 50% duty ratio, the turn-on time slot of the upper transistor T21 has a time length corresponding to (50-a)% of one period T, and the dead time slot of the upper transistor T21 has a time length corresponding to a % of one period T. The turn-off time slot of the upper transistor T21 has a time length corresponding to a 50% of one period T, the turn-on time slot of the lower transistor T22 has a time length corresponding to (50-a)% of one period T, and the dead time slot of the lower transistor T22 has a time length corresponding to a % of one period T. The turn-off time slot of the lower transistor T22 may have a time length corresponding to 50% of one period T, in which a may refer to 1%.

The DC-AC converter 153 converts the output power of the DC-DC converter 155 into AC power having square-wave AC voltage based on the AC power control signal (step S113) and outputs the output power of the DC-DC converter 155 to the transmission induction coil 210.

Hereinafter, the operation of the DC-AC converter 153 will be described with reference to FIG. 10.

The upper transistor T21 and the lower transistor T22 output square-wave power having square-wave voltage V3 by the upper and lower transistor control signals having the dead time slot as shown in FIG. 10.

The DC cut-off capacitor C21 cuts off the DC voltage of the square-wave power and outputs the square-wave AC power having the square-wave AC voltage V4 to the transmission induction coil 210.

The wireless power transmitting apparatus 200 transmits the square-wave AC power having the square-wave AC voltage V4 to the wireless power receiving apparatus 300 by resonance (step S115).

Hereinafter, the voltage magnitudes of the square-wave AC power which are generated by the power supply device and varied depending on frequency components according to the first embodiment will be described with reference to FIG. 11.

Figure 11:
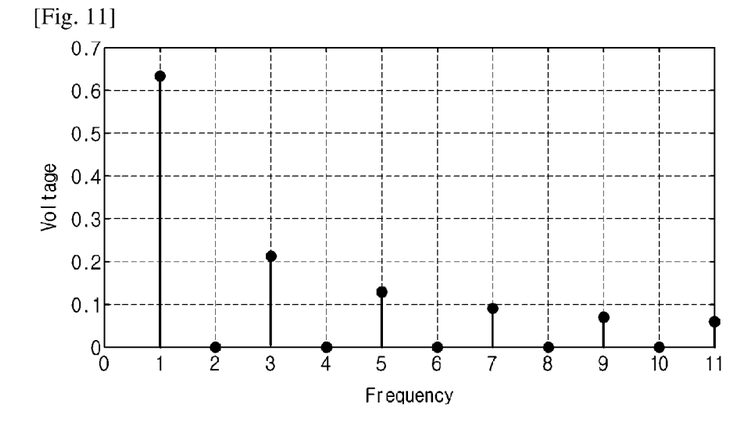
FIG. 11 is a graph showing the voltage magnitudes of the square-wave AC power which are generated by the power supply device and varied depending on the frequency components according to the first embodiment.

FIG. 11 is a graph showing the voltage magnitudes of the square-wave AC power which are generated by the power supply device and varied depending on the frequency components according to the first embodiment.

As shown in FIG. 11, when the square-wave AC power having voltage fluctuated between 1V and −1V has a 50% duty ratio, the square-wave AC power has the voltage magnitude of about 0.64V at a fundamental frequency component, the voltage magnitude of about 0.21V at the third harmonic frequency component, and the voltage magnitude of 0.13V at the fifth harmonic frequency component. The square-wave AC power has no even-numbered harmonic components.

In this case, power $P_{fundamental}$ at the fundamental frequency component, power $P_{2nd\_hanmornic}$ at the second harmonic frequency component, and power $P_{2nd\_hanmornic}$ at the $n^{th}$ harmonic frequency component can be obtained through Equations, 1, 2, and 3.

$$Pfundamental = \frac{Vfundamental^2}{Zfundamental} \quad \text{[Equation 1]}$$

In Equation 1, $Z_{fundandantal}$ refers to an input impedance at the fundamental frequency component, and $V_{fandamental}$ refers to a voltage magnitude at the fundamental frequency component.

$$P2nd\text{-}hanmornic = \frac{V2nd\text{-}hanmornic^2}{Z2nd\text{-}hanmornic} \quad \text{[Equation 2]}$$

In Equation 2, $Z_{2nd?harmonic}$ refers to an input impedance at the second harmonic frequency component, and $V_{2nd?harmonic}$ refers to a voltage magnitude at the second harmonic frequency component.

$$Pnth\text{-}hanmornic = \frac{Vnth\text{-}hanmornic^2}{Znth\text{-}hanmornic} \quad \text{[Equation 3]}$$

In Equation 3, $Z_{nth?harmonic}$ refers to an input impedance at the nth harmonic frequency component, and $V_{nth?harmonic}$ refers to a voltage magnitude at the nth harmonic frequency component.

Meanwhile, the power ratio at the fundamental frequency component may be calculated through Equation 4.

$$\text{Power-ratio-at-fundamental-frequency-component} = \frac{Pfundamental}{Pfundamental + Pnth\text{-harmonic}} \quad \text{[Equation 4]}$$

In Equation 4, when the duty ratio of the square-wave AC power is 50%, the power ratio at the fundamental frequency component is substantially 65.5%.

Since a resonance-type wireless power transmitting apparatus transmits only power, which is obtained at the fundamental frequency component, to the wireless power receiving apparatus, the power ratio at the fundamental frequency component becomes very power transmission efficiency.

Hereinafter, a power supply device capable of more improving power efficiency by more increasing the power ratio at the fundamental frequency component according to the second embodiment will be described with reference FIGS. 12 to 16.

Figure 12:
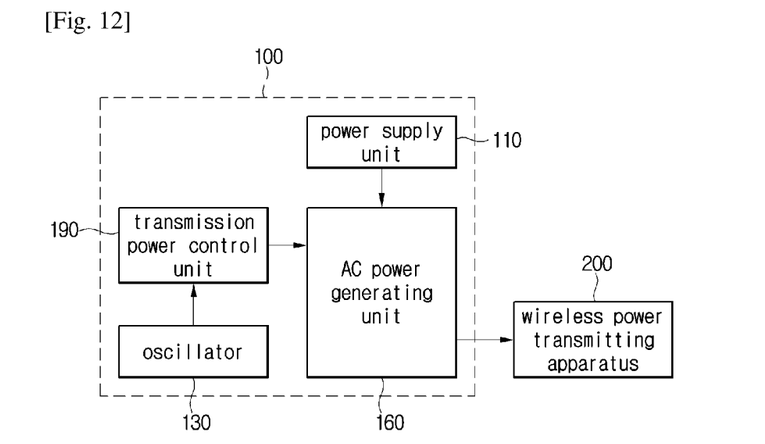
FIG. 12 is a block diagram showing a power supply device according to the second embodiment.

FIG. 12 is a block diagram showing a power supply device 100 according to the second embodiment.

As shown in FIG. 12, the power supply device 100 according to the second embodiment includes the power supply unit 110, the oscillator 130, an AC power generating unit 160, and a transmission power control unit 190. The power supply 100 is connected to the wireless power transmitting apparatus 200.

The power supply device 100 may be included in the wireless power transmitting apparatus 200, but the embodiment is not limited thereto.

The power supply unit 100 generates DC power having DC voltage and outputs the DC power having the DC voltage to the output terminal.

The oscillator 130 generates a sine-wave AC signal.

The transmission power control unit 190 generates a control signal to control the AC power generating unit 160 based on the sine-wave AC signal of the oscillator 130.

Figure 16:
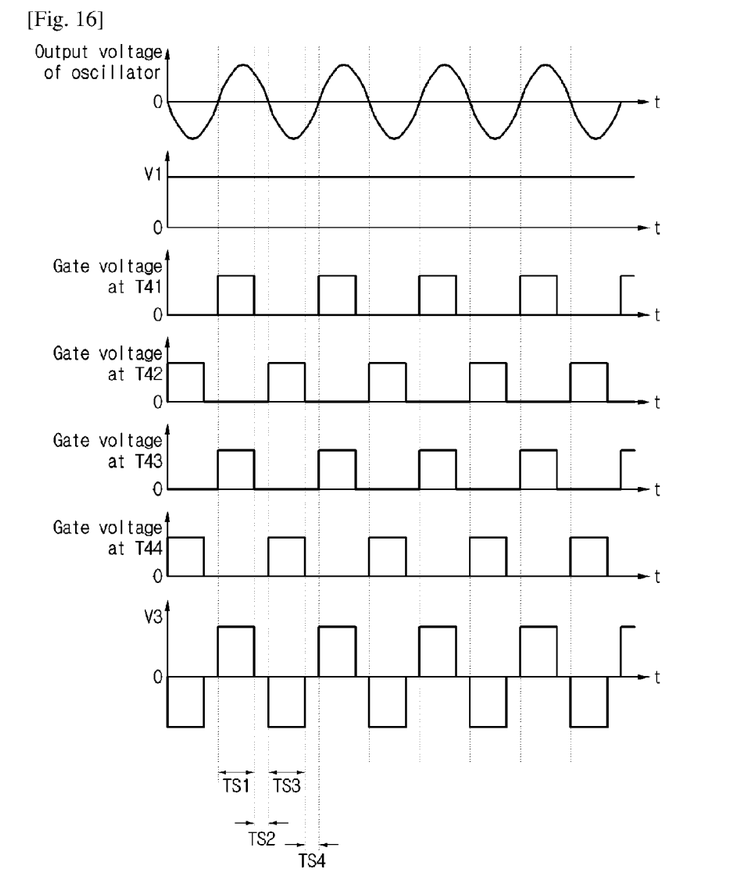
FIG. 16 illustrates waveforms at nodes in a power supply device according to the second embodiment.

The AC power generating unit 160 generates AC power having a voltage having a modified square wave by amplifying the sine-wave AC signal of the oscillator 130 using the DC power of the power supply unit 110 according to the control signal of the transmission power control unit 190. In this case, the modified square wave may have a quasi square wave as shown in FIG. 16 described above. The wireless power transmitting apparatus 200 transmits AC power having a quasi square wave, which is generated from the AC power generating unit 160, to the wireless power receiving apparatus 300 through the resonance, thereby increasing wireless power transmission efficiency.

Although not shown, the power supply device 100 may additionally include the DC-DC converter 155 and the DC power control unit 191. In this case, the DC-DC converter 155 may convert output power of the power supply unit 110 into DC power having DC voltage based on the DC power control signal generated from the DC power control unit 191 and supply the DC power to the AC power control unit 160.

Figure 13:
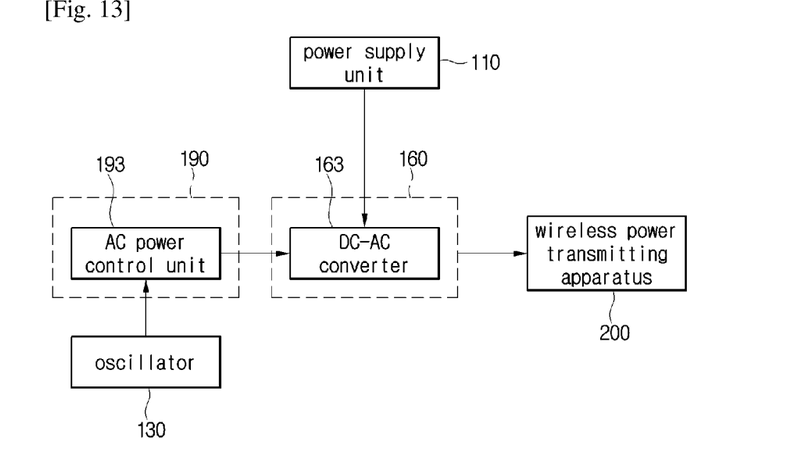
FIG. 13 is a block diagram showing an AC power generating unit and a transmission power control unit according to a second embodiment.

The wireless power transmitting apparatus 200 transmits the output power of the AC power generating unit 160, that is, the AC power having a quasi square waveform to the wireless power receiving apparatus 300 by resonance. FIG. 13 is a block diagram showing the AC power generating unit and the transmission power control unit according to a second embodiment.

As shown in FIG. 13, the AC power generating unit 160 according to the second embodiment includes a DC-AC converter 163. The transmission power control unit 190 includes an AC power control unit 193.

The AC power control unit 193 generates an AC power control signal based on a sine-wave AC signal of the oscillator 130.

The DC-AC converter 163 converts the output power of the power supply unit 110 into AC power having modified square-wave voltage based on the AC power control signal and outputs the AC power having the modified square-wave voltage to the transmission induction coil 210.

Figure 14:
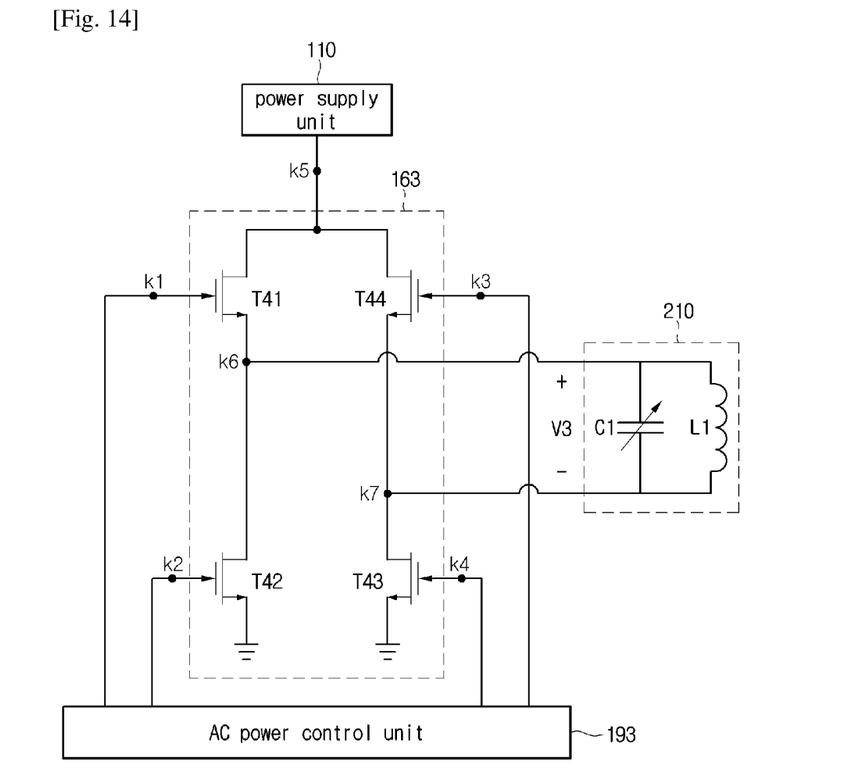
FIG. 14 is a circuit diagram showing a DC-AC converter according to the second embodiment.

FIG. 14 is a circuit diagram showing the DC-AC converter according to the second embodiment.

As shown in FIG. 14, the DC-AC converter 163 includes a full-bridge structure transistor circuit part, and the full-bridge structure transistor circuit part includes two half-bridge transistor circuit parts. One of the two half-bridge transistor circuit parts includes an upper transistor T41 and a lower transistor T42, and the other of the two half-bridge transistor circuit parts includes an upper transistor T44 and a lower transistor T43. The upper transistors T41 and T44 and the lower transistors T42 and T43 may include NMOSs, but may be substituted with different devices performing the same operation.

The AC power control unit 193 has first to fourth nodes (k1 to k4) provided at an output terminal thereof, and generates an AC power control signal based on the sine-wave AC signal of the oscillator 130.

The upper transistor T41 has a drain electrode connected to the fifth node k5 connected to the output terminal of the power supply unit 110, a gate electrode connected to the AC power control unit 193 through the first node k1, and a source electrode connected to a sixth node k6 connected to one terminal of the inductor L1 of the transmission induction coil 210.

The lower transistor T42 has a drain electrode connected to the sixth node k6, a gate electrode connected to the AC power control unit 193 through the second node k2, and a source electrode connected to the ground terminal.

The upper transistor T44 has a drain electrode connected to the fifth node k5 connected to the power supply unit 110, a gate electrode connected to the AC power control unit 193 through the third node k3, and a source electrode connected to the seventh node k7 connected to the opposite terminal of the inductor L1 of the transmission induction coil 210.

The lower transistor T43 has a drain electrode connected to the seventh node k7, a gate electrode connected to the AC power control unit 193 through the fourth node k4, and a source electrode connected to the ground terminal.

Hereinafter, the wireless power transmission method according to the second embodiment will be described with reference to FIGS. 15 and 16.

Figure 15:
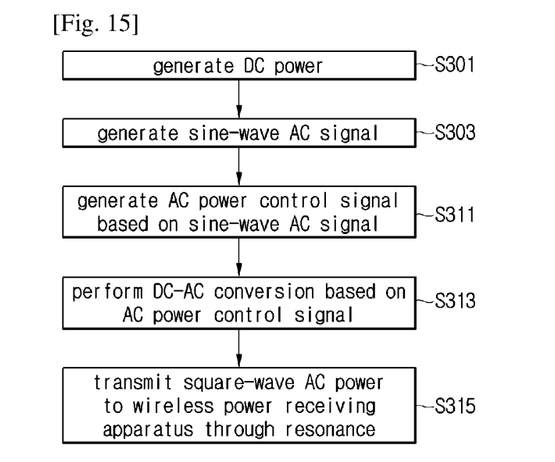
FIG. 15 is a flowchart showing a wireless power transmission method according to a second embodiment.

FIG. 15 is a flowchart showing the wireless power transmission method according to the second embodiment, and FIG. 16 illustrates waveforms at nodes in the power supply device according to the second embodiment.

In particular, FIG. 15 illustrates the wireless power transmission method in which the embodiments of FIGS. 12 to 14 are realized.

The power supply unit 110 generates DC power having DC voltage V1 (step S301). In particular, the power supply unit 110 may convert the AC power having the AC voltage into the DC power having the DC voltage V1.

The oscillator 130 generates a sine-wave AC signal (step S303).

The AC power control unit 193 generates an AC power control signal based on the sine-wave AC signal (step S311) and outputs the AC power control signal to the DC-AC converter 163. For the DC-AC converter 163 having the circuit shown in FIG. 14, the AC power control signal may include control signals of the upper transistor T41, the upper transistor T44, the lower transistor T42, and the lower transistor T43.

Especially, one period for the operation of the power supply device 100 includes a positive voltage output time slot TS1, a first zero-voltage output time slot TS2, a negative output time slot TS3, and a second zero-voltage output time slot TS4.

Hereinafter, each control signal will be described in detail with reference to FIG. 16.

During the positive voltage output time slot TS1, the control signal of the upper transistor T41 has a level to turn on the upper transistor T41, the control signal of the lower transistor T42 has a level to turn off the lower transistor T42, the control signal of the lower transistor T43 has a level to turn on the lower transistor T43, and the control signal of the upper transistor T44 has a level to turn off the upper transistor T44. Accordingly, the output voltage V3 of the AC power control unit 193 becomes positive voltage.

During the first zero-voltage output time slot TS2, the control signals of the upper transistor T41, the lower transistor T42, the lower transistor T43, and the upper transistor T44 have levels to turn off the upper transistor T41, the lower transistor T42, the lower transistor T43, and the upper transistor T44, respectively. Accordingly, the output voltage V3 of the AC power control unit 193 becomes zero-voltage.

During the negative voltage output time slot TS3, the control signal of the upper transistor T41 has a level to turn off the upper transistor T41, the control signal of the lower transistor T42 has a level to turn on the lower transistor T42, the control signal of the lower transistor T43 has a level to turn off the lower transistor T43, and the control signal of the upper transistor T44 has a level to turn on the upper transistor T44. Accordingly, the output voltage V3 of the AC power control unit 193 becomes negative voltage.

During the second zero-voltage output time slot TS4, the control signals of the upper transistor T41, the lower transistor T42, the lower transistor T43, and the upper transistor T44 have levels to turn off the upper transistor T41, the lower transistor T42, the lower transistor T43, and the upper transistor T44, respectively. Accordingly, the output voltage V3 of the AC power control unit 193 becomes zero-voltage.

The DC-AC converter 163 converts the output power of the power supply unit 110 into AC power having modified square-wave voltage based on the AC power control signal (step S313) and outputs the AC power having the modified square-wave voltage to the transmission induction coil 210.

One period of the quasi square-wave AC power having the square-wave AC voltage V3 includes the positive voltage output time slot TS1, the first zero-voltage output time slot TS2, negative voltage output time slot TS3 and the second zero-voltage output time slot TS4. During the positive voltage output time slot TS1, the square-wave AC voltage V3 becomes positive voltage. During the first zero-voltage output time slot TS2, the square-wave AC voltage V3 becomes zero-voltage. During the negative voltage output time slot TS3, the square-wave AC voltage V3 becomes negative voltage. During the second zero-voltage output time slot TS4, the square-wave AC voltage V3 becomes zero-voltage.

The duty ratio D of the quasi square-wave AC power may be calculated through following equation 5.

$$D = \frac{TS1}{TS1 + TS2 + TS3 + TS4} \times 100\%$$ [Equation 5]

The wireless power transmitting apparatus 200 transmits the modified square-wave AC power having the modified square-wave AC voltage V3 to the wireless power receiving apparatus 300 by using resonance (step S315).

Hereinafter, the input impedance measured at an input stage of the wireless power transmitting apparatus 200 will be described with reference to FIG. 17.

Figure 17:
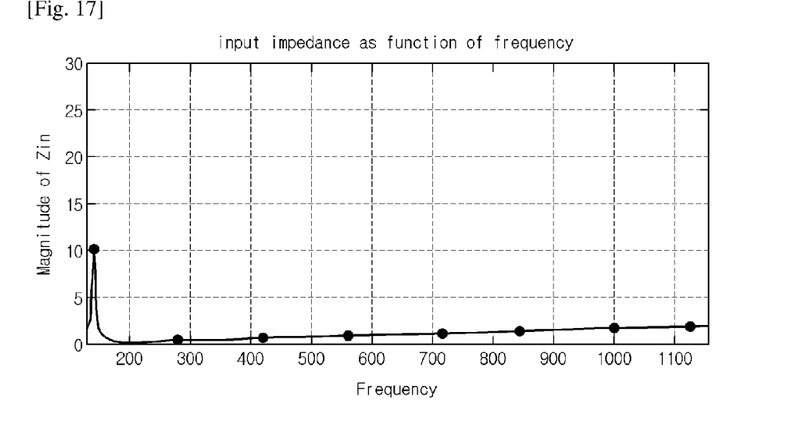
FIG. 17 is a graph showing an input impedance of a resonance-type wireless power transmission system according to the second embodiment.

FIG. 17 is a graph showing the input impedance of a resonance-type wireless power transmission system according to the second embodiment.

As shown in FIG. 17, the input impedance of the wireless power transmitting apparatus 200 has the maximum magnitude at the fundamental frequency component, and the minimum magnitude at the second harmonic frequency component. The input impedance of the wireless power transmitting apparatus 200 is increased as the order of the harmonic frequency component is increased from the second harmonic frequency component.

Hereinafter, the voltage magnitudes of quasi square-wave AC power which are generated by the power supply device and varied depending on frequency components according to the second embodiment will be described with reference to FIG. 18.

Figure 18:
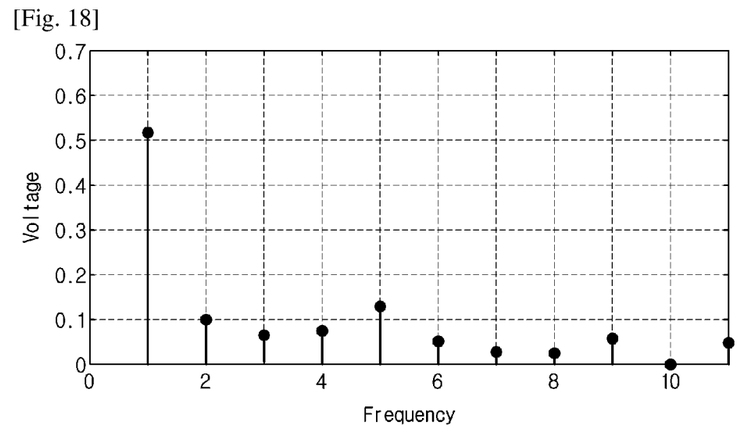
FIG. 18 is a graph showing the voltage magnitudes of the square-wave AC power which are generated by the power supply device and varied depending on the frequency components according to the second embodiment.

FIG. 18 is a graph showing the voltage magnitudes of the square-wave AC power which are generated by the power supply device and varied depending on the frequency components according to the second embodiment.

As shown in FIG. 18, when the square-wave AC power having voltage fluctuated among 1 V, 0 V and −1 V has a 30% duty ratio, the square-wave AC power has the voltage magnitude of about 0.52V at a fundamental frequency component, the voltage magnitude of about 0.09V at the third harmonic frequency component, and the voltage magnitude of 0.07V at the fifth harmonic frequency component.

The power ratio of the quasi square-wave AC power which is generated by the power supply device and varied according to the fundamental frequency components according to the second embodiment will be described with reference to FIG. 19.

Figure 19:
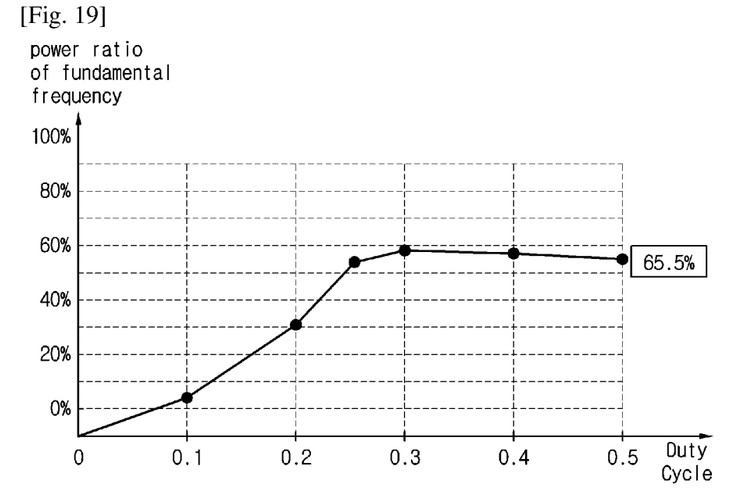
FIG. 19 is a graph showing the power ratio of the quasi square-wave AC power which is generated by the power supply device and varied according to the fundamental frequency components according to the second embodiment.

FIG. 19 is a graph showing the power ratio of the quasi square-wave AC power which is generated by the power supply device and varied according to the fundamental frequency components according to the second embodiment.

The power ratio of the quasi square-wave AC power at the fundamental frequency component may be calculated through Equation 4.

As shown in FIG. 19, the power ratio of the quasi square-wave AC power at the fundamental frequency component when the duty ratio of the quasi square-wave AC power is about 23% or more is greater than the power ratio of the square-wave AC power at the fundamental frequency component when the duty ratio of the square-wave AC power is 50%. Therefore, in order to obtain the efficiency greater than that in the case of a 50% duty ratio of the square-wave AC power, the duty ratio of the quasi square-wave AC power may be set to 23% or more.

Meanwhile, if the duty ratio of the quasi square-wave AC power is 50%, the transistor T41 and the transistor T42 may be simultaneously turned on, so that shoot-through current may be generated due to a short circuit. The shoot-through current may degrade the system efficiency and cause damage to the transistors T41 and T42. Accordingly, in order to prevent the shoot-through current from being generated due to the short circuit, the duty ratio of the quasi square-wave AC power may be set to 48% or less.

In addition, when the duty ratio of the quasi square-wave AC power is about 30%, the power ratio of the quasi square-wave AC power at the fundamental frequency component is maximized. Accordingly, in order to maximize the efficiency of the resonance-type wireless power transmission system, the duty ratio of the quasi square-wave AC power may be set to about 30%. For example, the duty ratio of the quasi square-wave AC power may be set to 26% or more, narrowly, 28% or more. In more narrowly, the duty ratio of the quasi square-wave AC power may be set to 29% or more. In addition, the duty ratio of the quasi square-wave AC power may be set to 40% or less, narrowly, 34% or less. In more narrowly, the duty ratio of the quasi square-wave AC power may be set 31%.

Any reference in this specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A wireless power transmitting apparatus to wirelessly transmit power to a wireless power receiving apparatus through a transmission resonance coil using resonance, the wireless power transmitting apparatus comprising:
    an AC power generating unit to generate quasi square-wave AC power having quasi square-wave voltage; and
    a transmission induction coil to transmit the quasi square-wave AC power to the transmission resonance coil through electromagnetic induction,
    wherein an input impedance of the wireless power transmitting apparatus has a maximum value at a fundamental frequency component, and
    wherein the input impedance of the wireless power transmitting apparatus has a minimum value at a second harmonic frequency component, and is increased as an order of a harmonic frequency component is increased from the second harmonic frequency component.

2. The wireless power transmitting apparatus of claim 1, wherein a duty ratio of the quasi square-wave AC power has a value allowing a power ratio of the quasi square-wave AC power at the fundamental frequency component to be greater than a power ratio of square-wave AC power at a fundamental frequency component when a duty ratio of the square-wave AC power is 50%.

3. The wireless power transmitting apparatus of claim 2, wherein the duty ratio of the quasi square-wave AC power is in a range of 23% to 48%.

4. The wireless power transmitting apparatus of claim 3, wherein the duty ratio of the quasi square-wave AC power is in a range of 28% to 34%.

5. The wireless power transmitting apparatus of claim 4, wherein the duty ratio of the quasi square-wave AC power is in a range of 29% to 31%.

6. The wireless power transmitting apparatus of claim 1, wherein a duty ratio of the quasi square-wave AC power has a value allowing a power ratio of the quasi square-wave AC power at the fundamental frequency component to be greater than a power ratio of square-wave AC power at a fundamental frequency component when a duty ratio of the square-wave AC power is 50%.

7. The wireless power transmitting apparatus of claim 1, wherein a duty ratio of the quasi square-wave AC power has a value allowing a power ratio of the quasi square-wave AC power at the fundamental frequency component to be greater than a power ratio of square-wave AC power at a fundamental frequency component when a duty ratio of the square-wave AC power is 50%.

8. A method of wirelessly transmitting power to a wireless power receiving apparatus through a transmission resonance coil using resonance by a wireless power transmitting apparatus, the method comprising:
    generating quasi square-wave AC power having quasi square-wave voltage; and
    transmitting the quasi square-wave AC power to the transmission resonance coil through electromagnetic induction,
    wherein an input impedance of the wireless power transmitting apparatus has a maximum value at a fundamental frequency component, and
    wherein the input impedance of the wireless power transmitting apparatus has a minimum value at a second harmonic frequency component, and is increased as an order of a harmonic frequency component is increased from the second harmonic frequency component.

9. The method of claim 8, further comprising:
    generating DC power;
    generating a sine wave; and
    generating an AC power control signal based on the sine wave,
    wherein the generating of the quasi square-wave AC power having the quasi square-wave voltage comprises generating the quasi square-wave AC power based on the AC power control signal.

10. The method of claim 9, wherein a duty ratio of the quasi square-wave AC power has a value allowing a power ratio of the quasi square-wave AC power at the fundamental frequency component to be greater than a power ratio of square-wave AC power at the fundamental frequency component when a duty ratio of the square-wave AC power is 50%.

11. The method of claim 8, wherein a duty ratio of the quasi square-wave AC power has a value allowing a power ratio of the quasi square-wave AC power at the fundamental frequency component to be greater than a power ratio of square-wave AC power at the fundamental frequency component when a duty ratio of the square-wave AC power is 50%.

12. A wireless power transmitting apparatus to wirelessly transmit power to a wireless power receiving apparatus through a transmission resonance coil using resonance, the wireless power transmitting apparatus comprising:
    an AC power control unit to generate an AC power control signal;
    a full-bridge structure transistor circuit part to output quasi square-wave AC power having quasi square-wave voltage based on the AC power control signal; and
    a transmission induction coil to transmit the quasi square-wave AC power to the transmission resonance coil through electromagnetic induction, wherein an input impedance of the wireless power transmitting apparatus has a maximum value at a fundamental frequency component, and wherein the input impedance of the wireless power transmitting apparatus has a minimum value at a second harmonic frequency component, and is increased at a second harmonic frequency component or more as an order of a harmonic frequency component is increased.

13. The wireless power transmitting apparatus of claim 12, wherein the full-bridge structure transistor circuit part comprises:

a first transistor comprising a drain electrode, to which DC power is applied, and a source electrode connected to one terminal of the transmission induction coil;

a second transistor comprising a drain electrode connected to the source electrode of the first transistor and a source electrode connected to a ground;

a third transistor comprising a drain electrode, to which the DC power is applied, and a source electrode connected to an opposite terminal of the transmission induction coil; and a fourth transistor comprising a drain electrode connected to the source electrode of the third transistor and a source electrode connected to the ground, wherein the source electrode of the first transistor and the source electrode of the third transistor output the quasi square-wave AC power.

14. The wireless power transmitting apparatus of claim 13, wherein a duty ratio of the quasi square-wave AC power at the fundamental frequency component has a value allowing a power ratio of the quasi square-wave AC power at the fundamental frequency component to be greater than a power ratio of square-wave AC power at the fundamental frequency component when a duty ratio of the square-wave AC power is 50%.

15. The wireless power transmitting apparatus of claim 12, wherein a duty ratio of the quasi square-wave AC power at the fundamental frequency component has a value allowing a power ratio of the quasi square-wave AC power at the fundamental frequency component to be greater than a power ratio of square-wave AC power at the fundamental frequency component when a duty ratio of the square-wave AC power is 50%.

16. The wireless power transmitting apparatus of claim 15, wherein the duty ratio of the quasi square-wave AC power is in a range of 23% to 48%.

* * * * *